United States Patent
Kamiyama et al.

(10) Patent No.: US 6,401,759 B1
(45) Date of Patent: Jun. 11, 2002

(54) LINER BAG FOR MANHOLE AND METHOD OF LINING A MANHOLE

(75) Inventors: Takao Kamiyama, Hiratsuka; Yasuhiro Yokoshima, Ibaraki-ken; Shigeru Endoh, Yasato-machi; Hiroyuki Aoki, Tokorozawa, all of (JP)

(73) Assignees: Shonan Gosei-Jushi Seisakusho K.K., Hiratsuka; Yokoshima & Company, Ibaraki-ken; Get Inc., Tsukuba; Oar Company, Tokorozawa, all of (JP)

( * ) Notice: Subject to any disclaimer, the term of this patent is extended or adjusted under 35 U.S.C. 154(b) by 0 days.

(21) Appl. No.: 09/465,224

(22) Filed: Dec. 14, 1999

(30) Foreign Application Priority Data

Dec. 22, 1998 (JP) ............................................ 10-365540

(51) Int. Cl.[7] ........................... F16L 55/16; B29C 63/28
(52) U.S. Cl. ............................... 138/98; 138/97; 52/20; 52/514; 52/515; 156/94; 156/287; 405/303; 405/154.1; 425/11; 264/31; 264/269
(58) Field of Search .............................. 405/303, 154.1; 52/20, 21, 514, 515; 264/269, 31; 156/94, 287; 138/97, 98, 140; 427/230; 139/389, 390; 383/37, 38, 116, 118; 425/11

(56) References Cited

U.S. PATENT DOCUMENTS

| 4,724,108 | A |   | 2/1988  | Jurgenlohmann et al. |
| 5,106,440 | A | * | 4/1992  | Tangeman ................... 156/94 |
| 5,205,886 | A | * | 4/1993  | White ........................ 156/71 |
| 5,265,981 | A | * | 11/1993 | McNeil ...................... 405/303 |
| 5,329,063 | A |   | 7/1994  | Endoh |

(List continued on next page.)

FOREIGN PATENT DOCUMENTS

| JP | 4-319135    | * | 4/1992 |
| JP | 5-59739     | * | 5/1993 |
| JP | 5-247993    | * | 5/1993 |
| JP | 1-148530    | * | 1/1996 |
| JP | 8-150659    | * | 8/1996 |
| JP | 9-220764    | * | 9/1997 |
| JP | 2000-185351 | * | 7/2000 |
| JP | 2001-43885  | * | 2/2001 |

Primary Examiner—Robert Canfield
(74) Attorney, Agent, or Firm—Knobbe, Martens, Olson & Bear, LLP (57) ABSTRACT

A liner bag for a manhole can have an improved durability after hardening with a fluid pressure barrier film left on the inner wall of a lined manhole, and a method of lining a manhole using the liner bag is capable of realizing a reduction in the number of steps involved in a manhole lining process to reduce a working time and a working cost. The liner bag for a manhole has an outer-layer liner bag including a first bag-shaped resin absorbent material, and an unhardened liquid hardenable resin impregnated in the first bag-shaped resin absorbent material, and an inner-layer liner bag including a second bag-shaped resin absorbent material, a highly air-tight plastic film coated over an inner surface of the second bag-shaped resin absorbent material, and an unhardened liquid hardenable resin impregnated in the second bag-shaped resin absorbent material, wherein the inner-layer liner bag has a thickness smaller than the outer-layer liner bag, and the inner-layer liner bag being inserted in the outer-layer liner bag. With the liner bag thus configure, since the manhole lining method performed using the manhole liner bag eliminates the necessity of stripping off the plastic film functioning as a fluid pressure barrier liner from the hardened liner bag and wasting the same, as before, it is possible to realize a reduction in the number of steps involved in the lining process, a working term, and a working cost.

9 Claims, 9 Drawing Sheets

U.S. PATENT DOCUMENTS

| | | | |
|---|---|---|---|
| 5,388,616 A | * 2/1995 | Muller et al. | 138/98 |
| 5,490,744 A | * 2/1996 | McNeil | 405/303 |
| 5,698,056 A | 12/1997 | Kamiyama et al. | |
| 5,736,077 A | * 4/1998 | Kamiyama et al. | 264/32 |
| 5,765,597 A | 6/1998 | Kiest, Jr. et al. | |
| 5,905,789 A | * 5/1999 | Kamiyama et al. | 264/516 |
| 5,916,406 A | 6/1999 | Kamiyama et al. | |
| 5,944,058 A | 8/1999 | Kamiyama et al. | |
| 5,971,031 A | * 10/1999 | Kamiyama et al. | 138/98 |
| 6,006,787 A | * 12/1999 | Kamiyama et al. | 138/98 |
| 6,024,910 A | * 2/2000 | Kamiyama et al. | 264/516 |
| 6,042,668 A | * 3/2000 | Kamiyama et al. | 156/93 |
| 6,105,619 A | * 8/2000 | Kiest, Jr. | 138/98 |
| 6,123,109 A | * 9/2000 | Kamiyama et al. | 138/98 |
| 6,136,135 A | * 10/2000 | Kamiyama et al. | 156/294 |
| 6,158,473 A | * 12/2000 | Kamiyama et al. | 138/98 |

* cited by examiner

LINER BAG FOR MANHOLE AND METHOD OF LINING A MANHOLE

BACKGROUND OF THE INVENTION

1. Field of the Invention

The present invention relates generally to manhole lining techniques, and more particularly to a liner bag for use in lining of a manhole, which has a two-layer structure composed of an inner-layer liner bag and an outer-layer liner bag, and a method of lining a manhole using this two-layer liner bag.

2. Description of the Related Background Art

When a manhole having a reducer section toward an opening becomes defective or too old to perform properly, the manhole is repaired and rehabilitated by lining the inner wall thereof without digging the earth to expose the manhole and disassembling the sections of the manhole. This non-digging method of repairing a manhole has been known and practiced commonly in the field of civil engineering.

A liner bag for use in lining of a manhole is typically designed to have a relatively large thickness so as to endure water pressure and earth pressure for a long term.

It is however extremely difficult to shape a thick resin absorbent material into a complicated bag form conformal to the shape of an existing manhole including a reducer and so on. On top of that, it is almost impossible to air-tight coat a plastic film, serving as a fluid pressure barrier film, on the surface of such a resin absorbent material in the form of a bag.

To overcome the difficulties inherent to the lining of a manhole, there has been proposed a method of lining a manhole using a fluid pressure barrier liner which is separate from a liner bag. This manhole lining method will be described below with reference to FIGS. 8 to 10.

Figure 8:
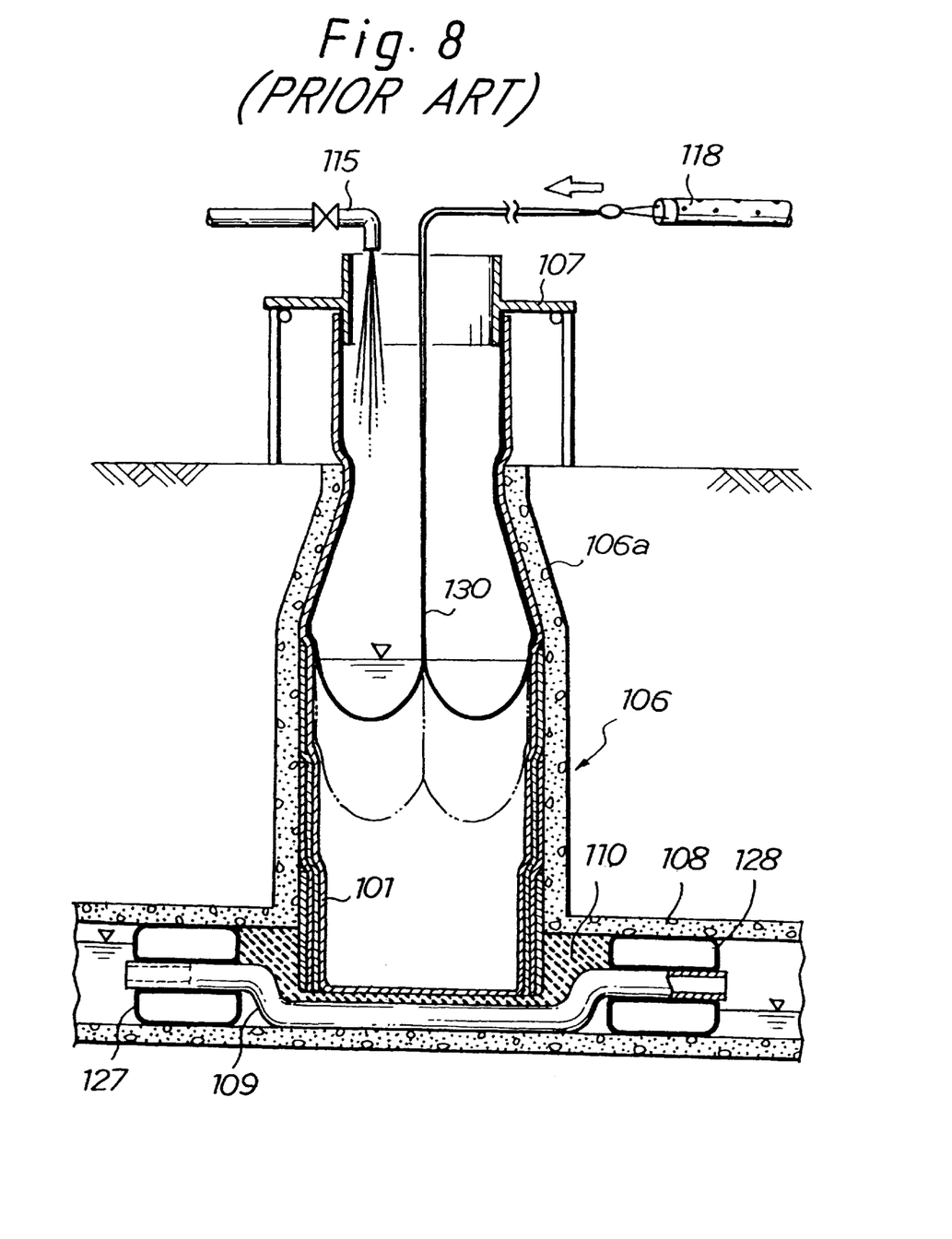
FIGS. 8 to 10 are cross-sectional views illustrating in order a variety of steps involved in a manhole lining method according to a prior art manhole lining method.
Figure 9:
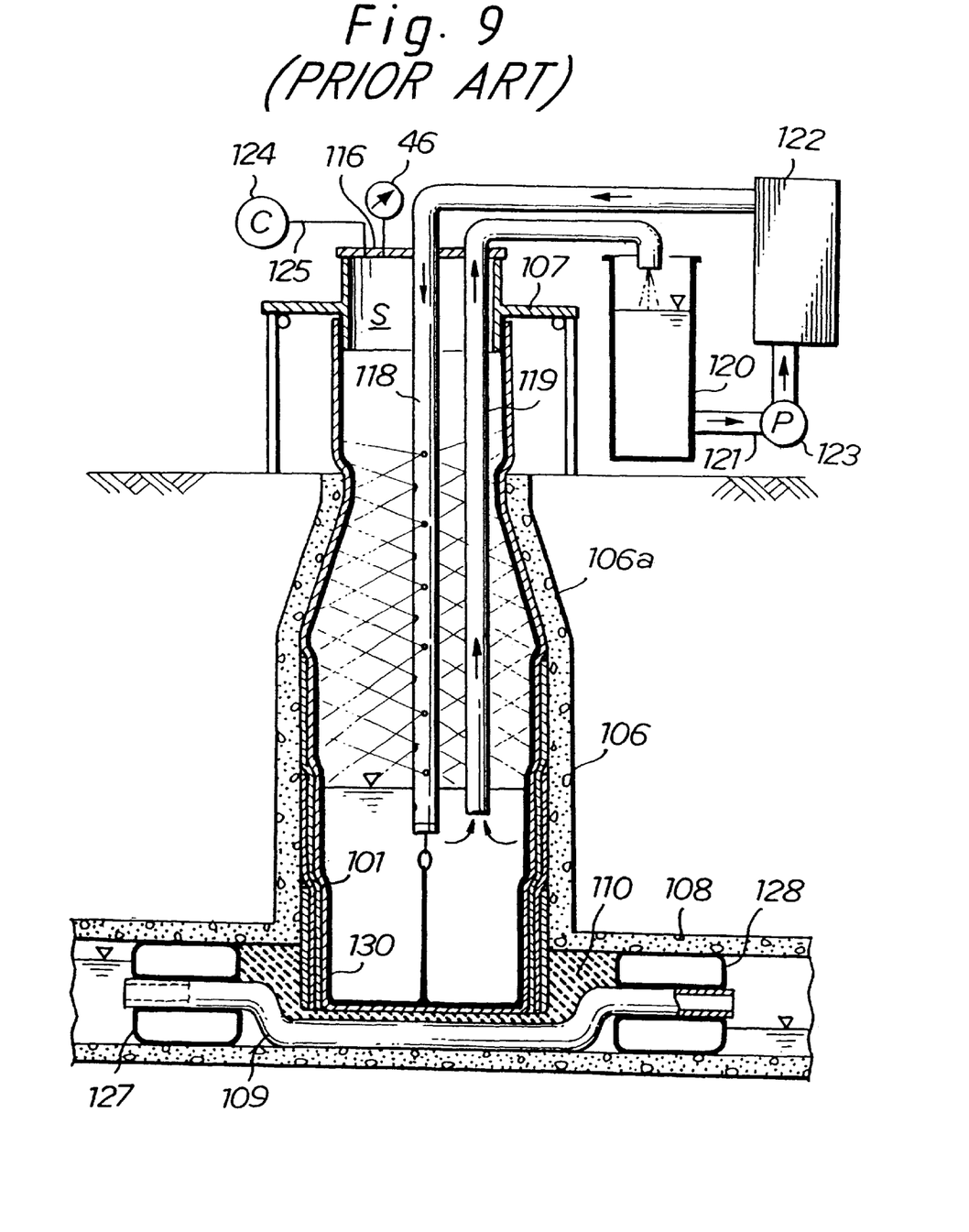
Figure 10:
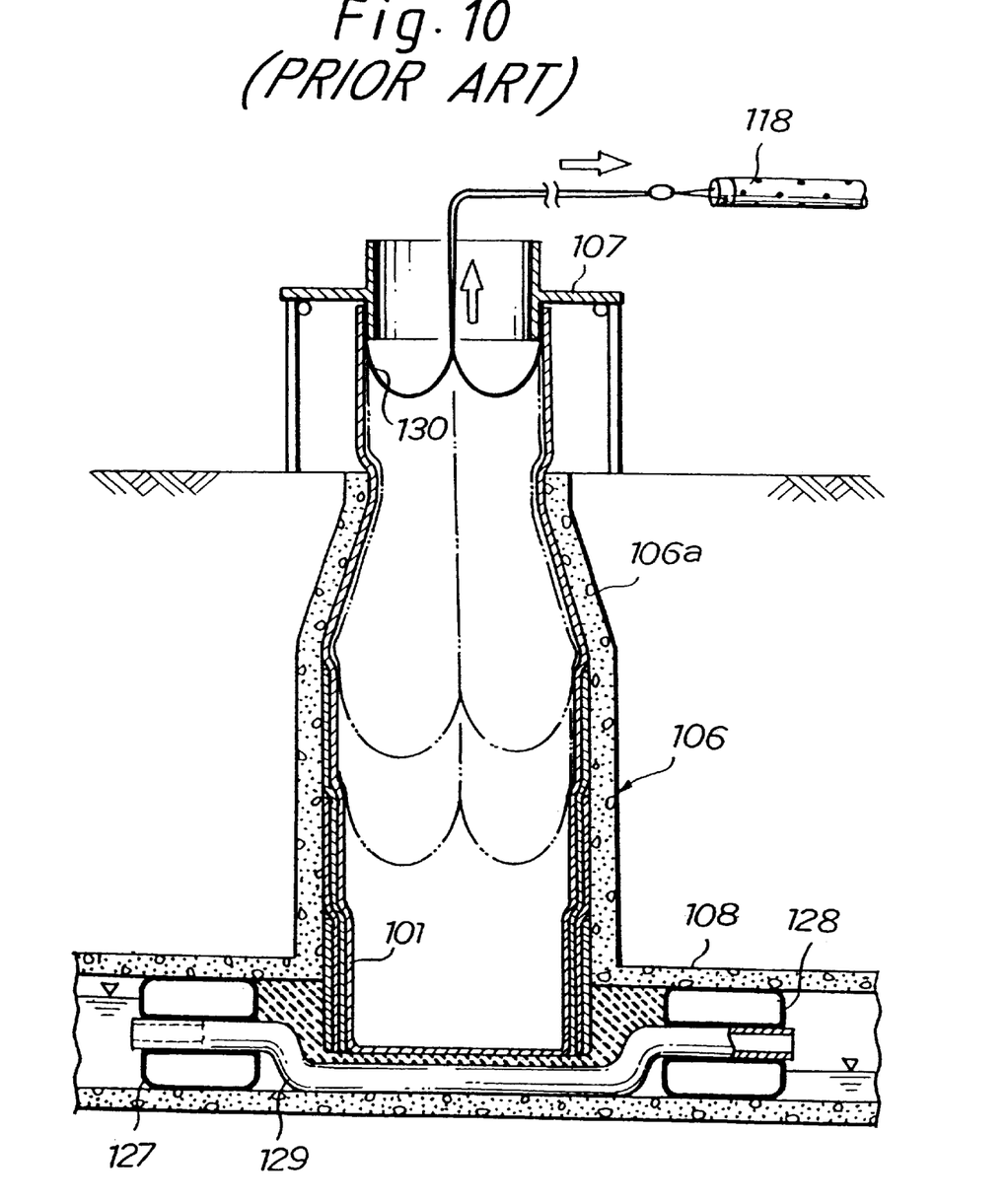

FIGS. 8 to 10 are cross-sectional views illustrating a conventional manhole lining method in order. Specifically, in this manhole lining method, a manhole lining bag 101 is inserted into an existing manhole 106 from the ground, and an opening at the upper end of the lining bag 101 is fitted on a lower portion of a fixing collar 107 installed on the ground, as can be seen in FIG. 8. The liner bag 101 is formed of a tubular resin absorbent material which has a portion formed to match the shape of a reducer section 106a of the existing manhole 106 (tapered form), and an unhardened thermosetting resin impregnated in the resin absorbent material.

In addition, a fluid pressure barrier liner 130 formed of a highly air-tight plastic tube is folded out such that one end thereof is also fitted on the lower portion of the fixing collar 107. When the insertion of the liner bag 101 into the manhole 106 is completed, water is poured into the inside of the folded-out fluid pressure barrier liner 130 from a water supply hose 115. The poured water causes the fluid pressure barrier liner 130, receiving the pressure (weight) of the water, to evert and go downward into the lining bag 101.

Then, after the fluid pressure barrier liner 130 has been completely everted and inserted into the liner bag 101, a hot water hose 118 attached to an extreme end of the fluid pressure barrier liner 130 is drawn into the fluid pressure barrier liner 130, as illustrated in FIG. 9. The cross-sectional view of FIG. 9 includes, as tools associated with the lining of the manhole 106, a pipeline 108 running below the manhole 106; a water passing hose 109 for passing water within the pipe line 108 during the lining of the manhole; a filler 110; and water stopping plugs 127, 128.

Next, as illustrated in FIG. 9, a cap 116 is placed on the upper opening of the fixing collar 107 and secured to the same to form a sealed space S within the fluid pressure barrier liner 130.

The hot water hose 118 and a drain hose 119 have been drawn into the sealed space S. A portion of the drain hose 119 extending out of the sealed space S has an end open to the top of a hot water tank 120 installed on the ground.

A water supply pipe 121 extending from a lower portion of the hot water tank 120 is connected to an inlet of a boiler 122, and a hot water pump 123 is interposed on the middle of the water supply pipe 121. One end of the hot water hose 118 is connected to the outlet side of the boiler 122. In addition, an air hose 125 extending out from a compressor 124 is connected to the cap 116.

When the compressor 124 is driven to supply compressed air into the sealed space S through the air hose 125, the fluid pressure barrier liner 130 and the liner bag 101 are pressed onto the inner wall of the manhole 106 by the pressure of the compressed air.

Next, with the foregoing condition being maintained, the boiler 122 and the hot water pump 123 are driven to supply the hot water within the hot water tank 120 to the boiler 122. After heated to a predetermined temperature by the boiler 122, the hot water is supplied into the sealed space S through the hot water hose 118. Specifically, the hot water running through the hot water hose 118 is sprayed out into the sealed space S just like shower from a plurality of spray holes formed through a portion of the hot water hose 118 that faces the sealed space S.

The hot water, which has served to heat the liner bag 101 and cooled down, drops and accumulates in the bottom of the sealed space S. This hot water accumulating in the bottom is urged by an inner pressure of the sealed space S to go back to the hot water tank 120 through the drain hose 119. Then, it is again supplied to the boiler 122 by the hot water pump 123, and heated by the boiler 122. Subsequently, the foregoing operations are repeated.

When the hot water is cyclically sprayed out from the hot water hose 118 through the circuit formed of the hot water hose 118, the drain hose 119, the hot water tank 120, the water supply pipe 121, the hot water pump 123 and the boiler 122, the lining bag 101 is heated to cause the thermosetting hardenable resin impregnated therein to be uniformly hardened. After the thermosetting resin impregnated in the lining bag 101 has been hardened, the fluid pressure barrier liner 130 is stripped off to remove the same from the lining bag 101, as illustrated in FIG. 10. As a result, the inner wall of the manhole 106 has been lined or repaired by the hardened liner bag 101, followed by the completion of a sequence of the lining works after unnecessary portions of the hardened liner bag 101 are cut.

The conventional manhole lining method described above, however, implies problems related to the durability of the hardened liner bag and the working cost. Specifically, since the fluid pressure barrier liner 130 is stripped off and disposed as waste after the completion of the lining, the durability of the liner bag cannot be increased by covering the surface of the hardened liner bag 101, after lined on the inner wall of the manhole, with a barrier film. In addition, an effort of stripping off the fluid pressure barrier liner 130 is additionally required, with an additional cost for disposing the stripped fluid pressure barrier liner 130 as a waste.

OBJECT AND SUMMARY OF THE INVENTION

The present invention has been made in view of the problems mentioned above, and it is an object of the present invention to provide a liner bag for a manhole which can have an improved durability after hardening with a fluid pressure barrier film being left on the inner wall of a manhole to be lined, and a method of lining a manhole using the liner bag which is capable of realizing a reduction in the number of steps involved in a manhole lining process to reduce a working time and a working cost.

To achieve the above object, in a first aspect of the present invention, there is provided a liner bag for a manhole which comprises an outer-layer liner bag including a first bag-shaped resin absorbent material, and an unhardened liquid hardenable resin impregnated in the first bag-shaped resin absorbent material, and an inner-layer liner bag including a second bag-shaped resin absorbent material, a highly air-tight plastic film coated over an inner surface of the second bag-shaped resin absorbent material, and an unhardened liquid hardenable resin impregnated in the second bag-shaped resin absorbent material, wherein the inner-layer liner bag has a thickness smaller than the outer-layer liner bag, and the inner-layer liner bag being inserted in the outer-layer liner bag.

Preferably, the outer-layer liner bag has an outer diameter smaller than an inner diameter of an existing manhole by 2% to 20% to form a clearance between the outer-layer liner bag and the existing manhole, and the inner-layer liner bag has an inner diameter smaller than the inner-diameter of the outer-layer liner bag by 2% to 20% to form a clearance between the inner-layer and outer-layer liner bags. The outer-layer liner bag and the inner-layer liner bag may respectively have a reducer portion, and the length of the outer-layer liner bag except for the reducer portion is set shorter than the depth of the existing manhole except for a reducer section of the existing manhole, wherein the length of the outer-layer liner bag except for the reducer portion is set shorter than the length of the outer-layer liner bag except for the reducer portion. The thickness of the second resin absorbent material constituting the inner-layer liner bag may be set to a range of 2 m/m to 12 m/m when it is applied with a load of 200 g/cm$^2$. The second resin absorbent material of the inner-layer liner bag may be made of unwoven fabric, and the plastic film coated over the inner surface of the resin absorbent material is formed of a polyurethane film having a Shore hardness equal to or larger than 85 and a thickness equal to or larger than 0.25 m/m. The second resin absorbent material constituting the inner-layer liner bag may be made of unwoven fabric having a weight ranging from 100 g/m$^2$ to 1500 g/m$^2$.

The highly air-tight plastic film coated over the inner surface of the second bag-shaped resin absorbent material is left as a fluid pressure barrier film after the manhole liner bag has been hardened.

According to a second aspect of the present invention, there is provided a method of lining a manhole comprising the steps of providing an outer-layer liner bag including a first bag-shaped resin absorbent material, and an unhardened liquid hardenable resin impregnated in the first bag-shaped resin absorbent material, providing an inner-layer liner bag including a second bag-shaped resin absorbent material, a highly air-tight plastic film coated over an inner surface of the second bag-shaped resin absorbent material, and an unhardened liquid hardenable resin impregnated in the second bag-shaped resin absorbent material, the inner-layer liner bag having a thickness smaller than the outer-layer liner bag, inserting the outer-layer liner bag into an existing manhole, everting and inserting the inner-layer liner bag into the outer-layer liner bag to form a manhole liner bag, acting a fluid pressure on a sealed space formed within the manhole liner bag to press the manhole liner bag onto an inner wall of the existing manhole, and hardening the liquid hardenable resin impregnated in the first resin absorbent material of the outer-layer liner bag and the second resin absorbent material of the inner-layer liner bag.

The highly air-tight plastic film coated over the inner surface of the second bag-shaped resin absorbent material is not stripped off but is left as a fluid pressure barrier film after the manhole liner bag has been hardened.

As appreciated, according to the method of lining a manhole using the manhole liner bag of the present invention, since the manhole lining method eliminates the necessity of stripping off the highly air-tight plastic film from the hardened liner bag and wasting the same, as before, it is possible to realize a reduction in the number of steps involved in the lining process, a working term, and a working cost.

Furthermore, the plastic film, functioning as a fluid pressure barrier film during the lining process, remains as it is on the inner surface of the hardened liner bag, after the lining, so that the surface of the liner bag, as a hardened material, is covered with and protected by the plastic film to increase the durability of the liner bag.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereinafter be described in connection with some embodiments thereof with reference to the accompanying drawings.

Figure 1:
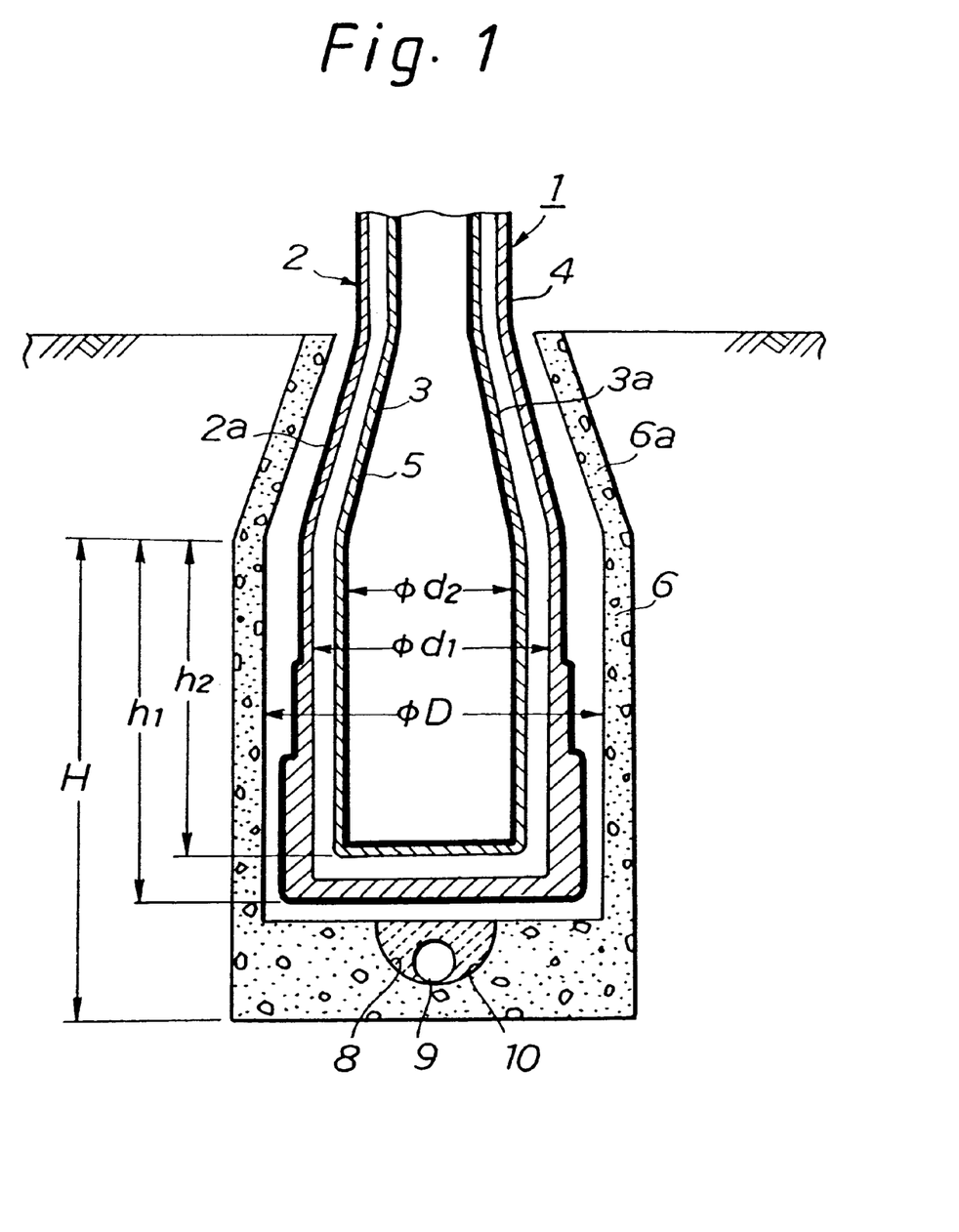
FIG. 1 is a cross-sectional view illustrating a liner bag for a manhole according to the present invention which has been inserted into an existing manhole.
Figure 2:
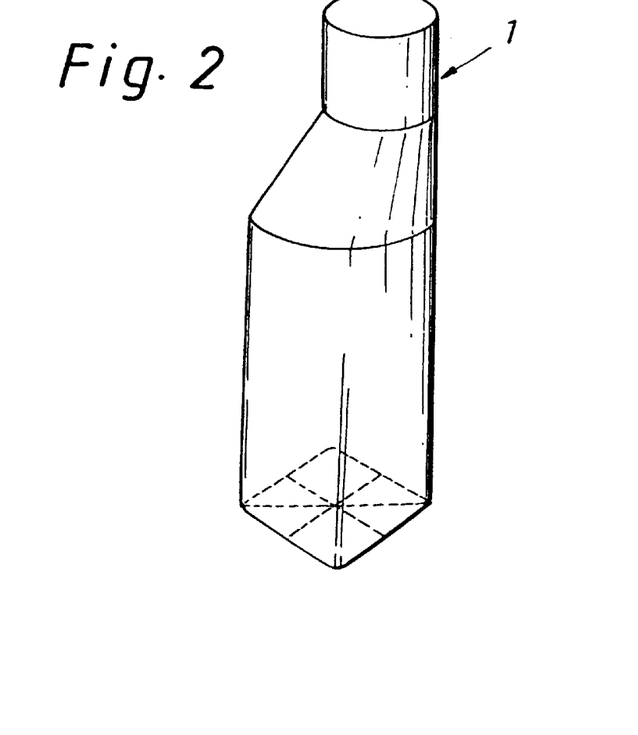
FIGS. 2 to 4 are perspective views each illustrating a form of the manhole liner bag according to the present invention.
Figure 3:
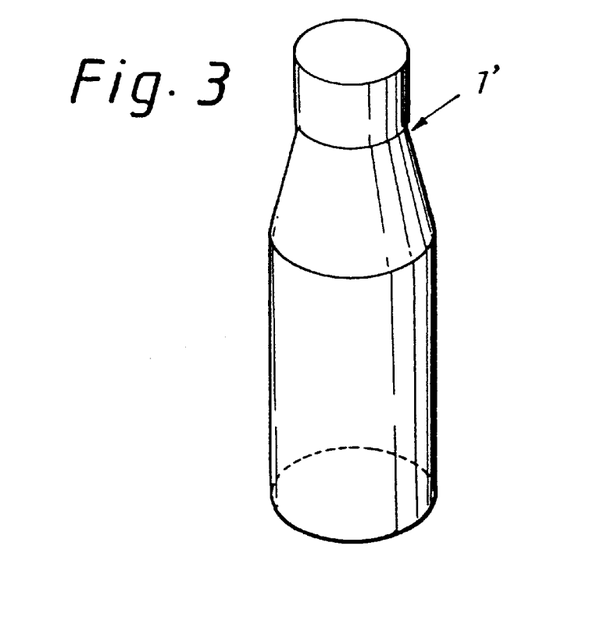
Figure 4:
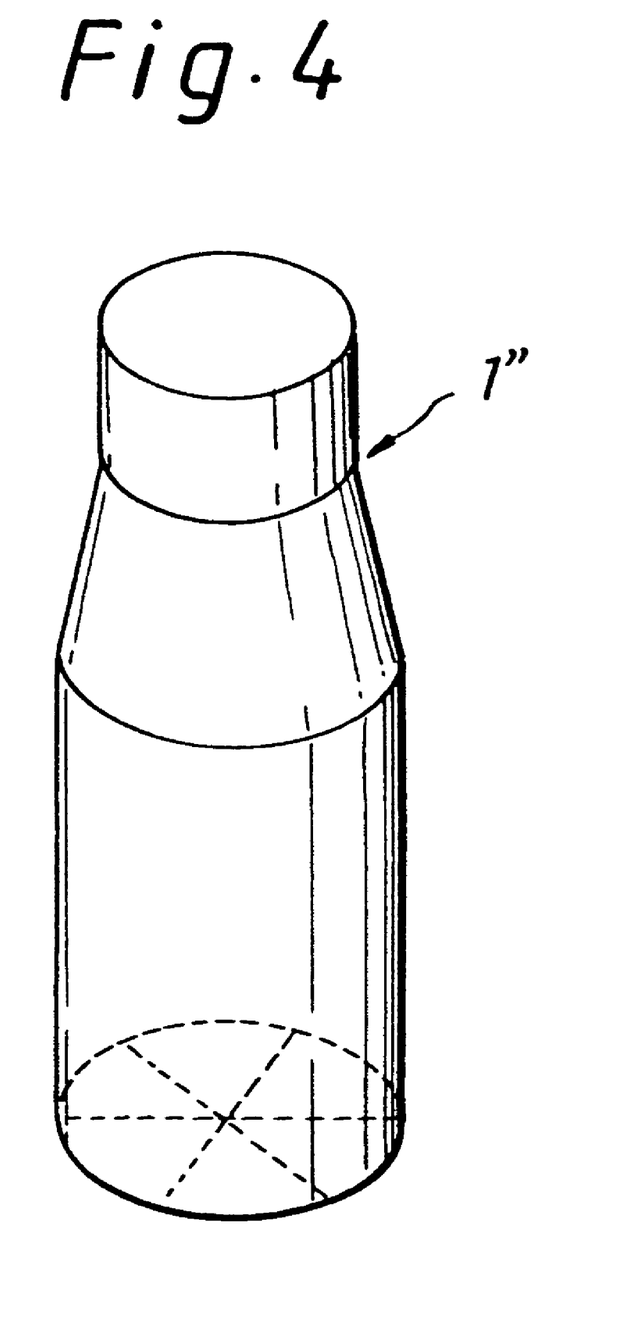

FIG. 1 illustrates a liner bag for a manhole according to the present invention which has been inserted in an existing manhole, and FIGS. 2 to 4 are perspective views illustrating a variety of forms of the manhole liner bag according to the present invention.

The manhole liner bag (hereinafter simply referred to as the "lining bag") according to the present invention is configured in a two-layer structure which is composed of an outer-layer liner bag 2 including a bag-shaped resin absorbent material impregnated with an unhardened liquid hardenable resin, and an inner-layer liner bag 3, inserted in the outer-layer liner bag 2, which includes a bag-shaped resin absorbent material having the inner surface coated with a highly air-tight plastic film 5 and impregnoted with an unhardended liquid hardenable resin.

The outer-layer liner bag 2 has the outer surface coated with a highly air-tight plastic film 4 which has a substantially larger thickness than that of the inner-layer liner bag 3, such that a majority of a thickness required to the entire liner bag 1 from a view point of structural design, is ensured by this outer-layer lining bag 2.

The thick resin absorbent material of the outer-layer lining bag 2 is molded into a bag shape which is substantially similar to the shape of an existing manhole 6, with a reducer portion 2a partially formed therein corresponding to a reducer section 6a of the existing manhole 6. When the resin absorbent material is opened in the form of tube, its bottom presents a flat surface. It is important to note that the resin absorbent material becomes gradually thicker toward the depth direction so as to endure water pressure and earth pressure which also become larger toward the depth direction. A material suitable for the resin absorbent material may be unwoven fabric made of polyester, vinylon or the like.

When the bag-shaped resin absorbent material has been provided as described above, the resin absorbent material is made entirely flat, covered with the plastic film 4, and vacuumed. This results in the plastic film 4 in close contact with the resin absorbent material. With this state maintained, the plastic film 4 is heated to weld the plastic film 4 onto the outer surface of the resin absorbent material. The coating on the outer surface of the resin absorbent material with the plastic film 4 is performed for the following purposes. First, the resin absorbent material is vacuumed during a resin impregnating work, later described. Second, the liner bag 1 impregnated with a hardenable resin (more particularly, a thermosetting resin) is immersed in ice water for custody. Third, the liner bag 1 as a hardened material after lining should be protected by the plastic film 4. It is understood that since this plastic film 4 is positioned on the outer surface of the liner bag 1, after it is hardened, flash, wrinkle, or pinhole encountered on the plastic film 4, if any, would not cause any serious problem. Here, a material suitable for the plastic film 4 may be a composite film or the like which may include a polyurethane film, polyethylene, nylon, or EVOH.

After the resin absorbent material has been coated with the plastic film 4 as described above, the resin absorbent material is impregnated with an unhardened liquid thermosetting resin which may be added with a hardening catalyst or a hardening agent. More specifically, while the resin absorbent material is vacuumed, a thermosetting resin is poured into the resin absorbent material from an opening at one end thereof, causing the thermosetting resin to be drawn by a negative pressure generated in the resin absorbent material and uniformly impregnated into the entire resin absorbent material. In this way, the outer-layer liner bag 2 is provided. The thermosetting resin for use in impregnating into the resin absorbent material may be unsaturated polyester resin, a vinyl ester resin, an epoxy resin, or the like.

The inner-layer liner bag 3, when inserted into the outer-layer liner bag 2 as illustrated in FIG. 1, has the plastic film 5 coated over the inner surface thereof. This, however, is a result of eversion and insertion into the outer-layer liner bag 2 with a fluid pressure for the manhole lining process, later described, and before the eversion, the plastic film 5 is coated over the outer surface of the inner-layer liner bag 3 (see FIG. 5).

The inner-layer liner bag 3, before the eversion, is fabricated in the following manner. A thin resin absorbent material having the outer surface previously coated with the highly air-tight plastic film 5, functioning as a fluid pressure barrier film, is molded into a bag shape substantially similar to the shape of the existing manhole 6, in a manner similar to the outer-layer liner bag 2. Then, the resin absorbent material molded into a bag shape is impregnated with an unhardened thermosetting resin. The inner-layer liner bag 3 is partially formed with a reducer portion 3a which corresponds to the reducer section 6a of the existing manhole 6. When the resin absorbent material is opened in the form of tube, its bottom is a flat surface.

As described above, thanks to a reduced thickness of the resin absorbent material having the outer surface previously coated with the plastic film 5 used to form part of the inner-layer liner bag 3, the resin absorbent material is light and easy to stretch, in case it is wrinkled. These preferred properties of the resin absorbent material advantageously facilitate the molding of the inner-layer liner bag 3 into a rather complicated shape conformal to the shape of the existing manhole 6, an air-tight sealing process for the bottom and so on, and the formation of the plastic film 5 which functions as a fluid pressure barrier film.

The resin absorbent material constituting the inner-layer liner bag 3 is made of unwoven fabric such as polyester, vinylon or the like with a weight ranging from 100 g/m² to 1500 g/m². The thickness of the resin absorbent material is set to a range of 2 m/m to 12 m/m when it is applied with a load (pressure) of 200 g/cm². Also, the plastic film 5 applied over the resin absorbent material is formed of a composite film or the like including a polyurethane film, polyethylene, nylon or EVOH, as is the case of the plastic film 4. However, in a particular case where an unsaturated polyester resin is used as the thermosetting resin impregnated into the resin absorbent material, a polyurethane film having a Shore hardness equal to or larger than 85 and a thickness equal to or larger than 0.25 m/m in order to improve a styrene resistance property and stretch resistance property, as well as to simplify the air-tight working.

The inner-layer liner bag 3 configured as described is everted and inserted into the outer-layer liner bag 2 with a fluid pressure, before the manhole lining process, to provide the liner bag 1 as illustrated in FIG. 1. In the resulting liner bag 1, the inner-layer liner bag 3 has the inner surface coated with the plastic film 5 which functions as a fluid pressure barrier film.

The liner bag 1 impregnated with the thermosetting resin is flexible and heavy, so that it is difficult to precisely position the liner bag 1 over the inner surface of the existing manhole 6 having a complicated shape including the reducer section 6a. Once the liner bag 1 is stretched or twisted during installation, the inner surface of the liner bag 1 will suffer from wrinkles after the hardening.

To solve this problem, this embodiment of the present invention provides several features for preventing wrinkles from occurring on the inner surface of the liner bag 1 even if a slight offset is experienced during the installation of the liner bag 1 into the existing manhole 6. Specifically, the respective resin absorbent materials constituting the outer-layer liner bag 2 and the inner-layer liner bag 3 are made of materials which exhibit ductility with the action of the fluid pressure. The outer-layer liner bag 2 has an inner diameter $\phi d_1$ smaller than the inner diameter $\phi D$ of the existing manhole 6 by 2% to 20% ($\phi d_1 < \phi D$) so as to form a clearance between the outer-layer liner bag 2 and the existing manhole 6. The inner-layer liner bag 3 has an inner diameter $\phi d_2$ smaller than the inner diameter $\phi d_1$ of the outer-layer liner bag 2 by 2% to 20% ($\phi d_2 < \phi d_1$) so as to form a clearance between the two liner bags 2, 3. In addition, the length (depth) $h_1$ of the outer-layer liner bag 2 except for the reducer portion 2a is set shorter than the depth H of the existing manhole 6 except for the reducer section 6a ($h_1 < H$). The length (depth) $h_2$ of the outer-layer liner bag 3 except for the reducer portion 3a is set shorter than the length (depth) $h_1$ of the outer-layer liner bag 2 except for the reducer portion 2a ($h_2<h_1$).

When the liner bag 1 configured as described above is extended in a tube shape, its bottom presents a flat surface as illustrated in FIGS. 2 to 4. Specifically, FIG. 2 illustrates an example in which a flat surface, substantially rectangular, is formed on the bottom of the liner bag 1, while FIGS. 3 and 4 illustrate examples in which a circular flat surface is formed on the bottoms of liner bags 1', 1", respectively. The examples illustrated in FIGS. 3 and 4 differ in that the circular bottom illustrated in FIG. 3 is separately made, while the bottom illustrated in FIG. 4 is shaped into a circle by sewing zig-zag portions formed on the bottom of the liner bag 1".

The liner bag 1 is carried to a work site as immersed in ice water so as to prevent the thermosetting resin impregnated in the liner bag 1 from being hardened due to any heat. In this event, since the liner bag 1 has the outer surface coated with the highly air-tight plastic film 4 as described above to prevent water from intruding into the liner bag 1, the thermosetting resin impregnated in the liner bag 1 can be held in a stable unhardened state.

Next, a manhole lining method performed according to the present invention using the liner bag 1 configured as above will be described below with reference to FIGS. 5 to 7.

Figure 5:
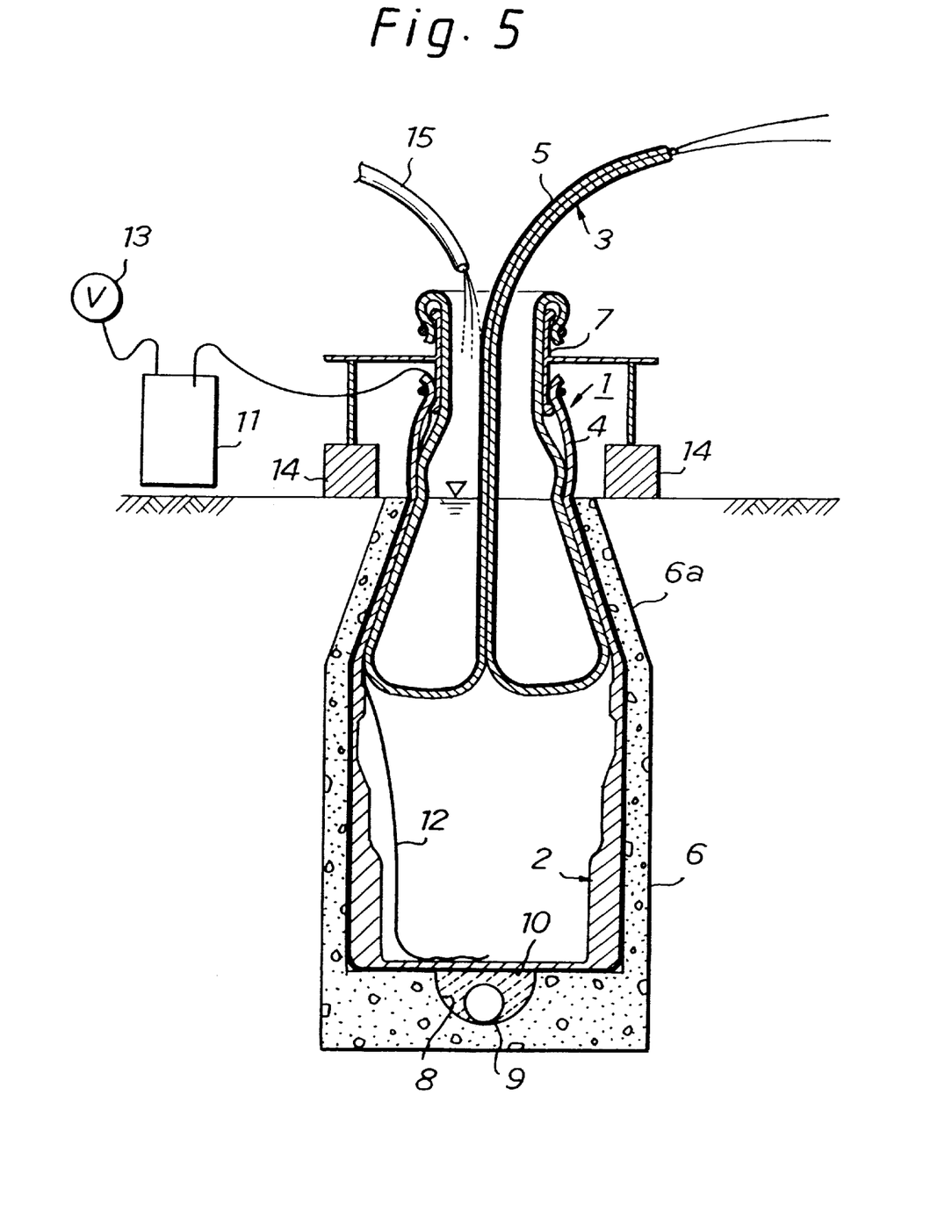
FIGS. 5 to 7 are cross-sectional views illustrating in order a variety of steps involved in a manhole lining method according to the present invention.
Figure 6:
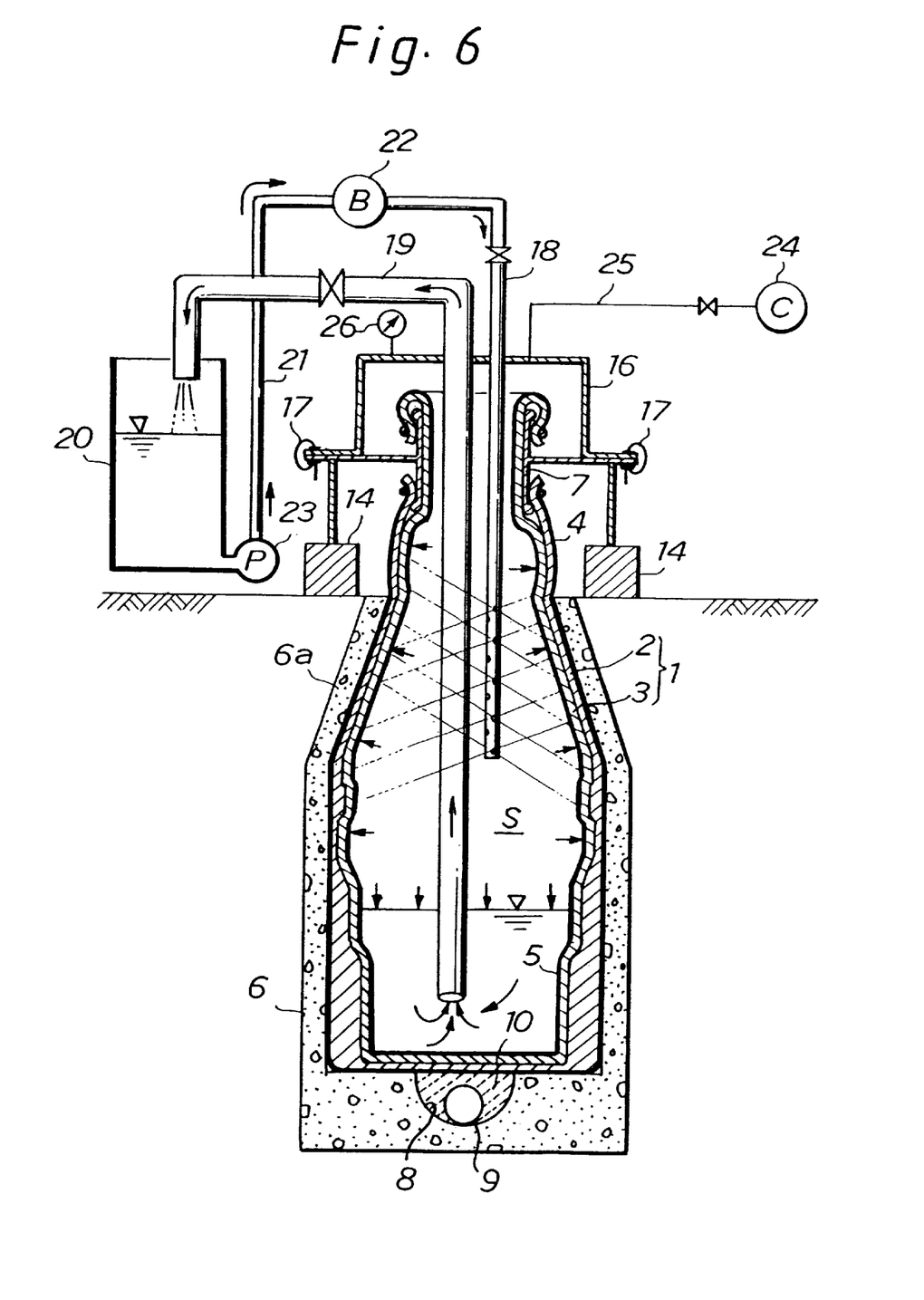
Figure 7:
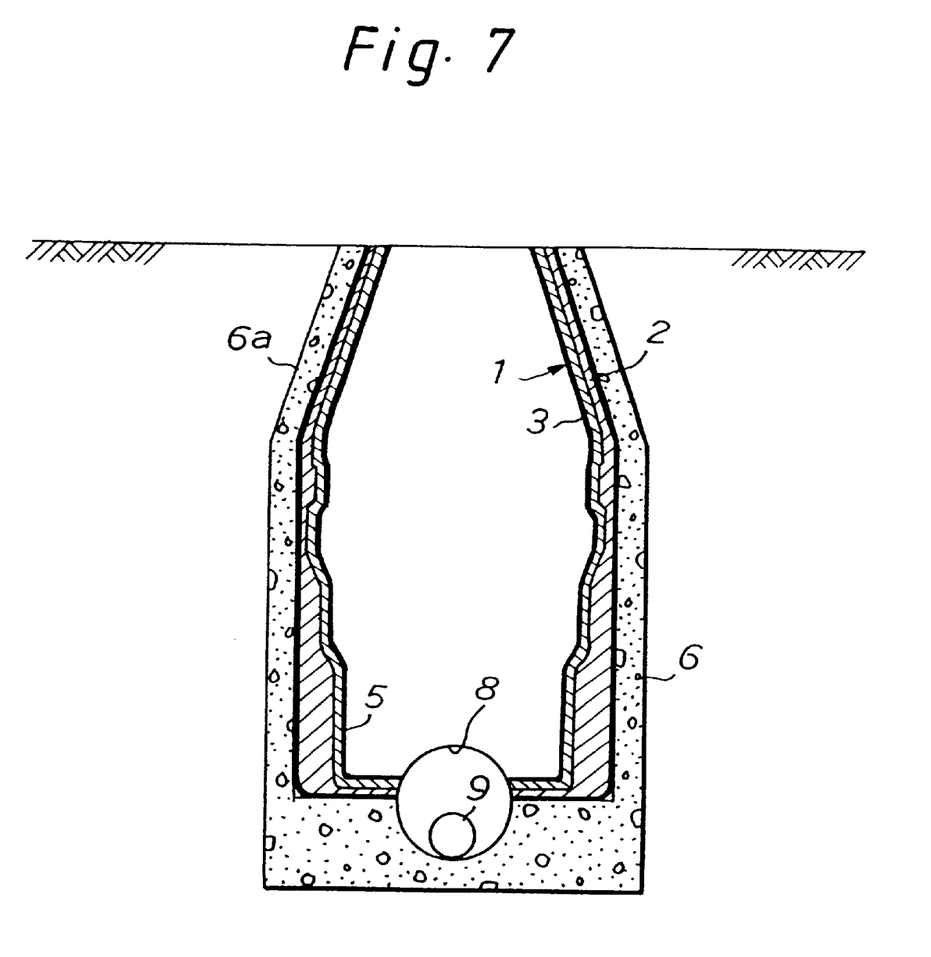

FIGS. 5 to 7 are cross-sectional views illustrating in order a variety of steps involved in the manhole lining method according to the present invention. For preparing for a lining process, the open ends of the outer-layer liner bag 2 and the inner-layer liner bag 3, constituting the liner bag 1, are respectively attached to a fixing collar 7 on the ground, as can be seen in FIG. 5. In this event, the inner-layer liner bag 3 of the liner bag 1, which is not yet everted (the outer surface is coated over the plastic film 5), has its open end fitted on the outer periphery of an upper end portion of the fixing collar 7.

Subsequently, the liner bag 1 is hung down together with the fixing collar 7 by a crane, not shown, and the outer-layer liner bag 2 is inserted into the existing manhole 6, as can be seen in FIG. 5. During the lining operation, water stopping plugs, not shown, are disposed at portions of a pipeline 8 open to and sandwiching the existing manhole 6 (two positions upstream and downstream of the manhole 6). A water passing hose 9 is inserted through both the water stopping plugs such that the pipeline 8 upstream of the upstream water stopping plug is communicated with the pipeline 8 downstream of the downstream water stopping plug through the water passing hose 9. A portion of the pipeline 8 sandwiched by the two water stopping plugs is filled with a filler 10 such as wood chips, bran or the like. A vacuum hose 12 extending from a vacuum tank installed on the ground is inserted into the outer-layer liner bag 2, and a vacuum pump 13 is connected to the vacuum tank 11.

After the outer-layer liner bag 2 has been inserted into the existing manhole 6 as described above, the fixing collar 7 is securely attached to an anchor base 14 installed on the ground. Subsequently, a portion of the inner-layer liner bag 3 is folded inside, as can be seen in FIG. 5, and water is poured into the inside of the folded portion of the inner-layer liner bag 3. As a result, the inner-layer liner bag 3 is everted and inserted into the outer-layer liner bag 2 by water pressure (the weight of the water), resulting in the formation of the liner bag 1 as illustrated in FIG. 1. The resulting liner bag 1 has the inner surface coated with the plastic film 5 which functions as a fluid pressure barrier film. While the inner-layer liner bag 3 is being inserted into the outer-layer liner bag 2, the vacuum pump 13 is driven to suck air within the outer-layer liner bag 2 into the vacuum tank 11 through the vacuum hose 12, so that the inner-layer liner bag 3 can be smoothly inserted into the outer-layer liner bag 2 without resistance.

Next, a cap 16 is placed on the upper opening of the fixing collar 7, and fixed by a plurality of G clamps 17, as can be seen in FIG. 6, resulting in the formation of a sealed space S within the liner bag 1.

Subsequently, a hot water hose 18 and a drain hose 19 are drawn into the sealed space S. A portion of the drain hose 19 extending out of the sealed space S has an end open to the top of a hot water tank 20 installed on the ground.

A water supply pipe 21 extending from a lower portion of the hot water tank 20 is connected to an inlet of a boiler 22, and a hot water pump 23 is interposed on the middle of the water supply pipe 21. One end of the hot water hose 18 is connected to the outlet side of the boiler 22. In addition, an air hose 25 extending out from a compressor 24 is connected to the cap 16, and a pressure gage 26 is attached to the cap 16 for measuring the inner pressure of the sealed space S.

When the compressor 24 is driven to supply compressed air into the sealed space S through the air hose 25, the inner-layer liner bag 3 is first inflated by the compressed air to come into close contact with the outer liner bag 2. Then, the outer-layer liner bag 2 is inflated by the compressed air to come into close contact with the inner wall of the existing manhole 6.

Next, with the foregoing condition being maintained, the boiler 22 and the hot water pump 23 are driven to supply the hot water within the hot water tank 20 to the boiler 22. After heated to a predetermined temperature by the boiler 22, the hot water is supplied into the sealed space S through the hot water hose 18. Specifically, the hot water running through the hot water hose 18 is sprayed out into the sealed space S just like shower from a plurality of spray holes formed through a portion of the hot water hose 18 that faces the sealed space S.

The hot water, which has served to heat the liner bag 1 and cooled down, drops and accumulates in the bottom of the sealed space S. This hot water accumulating in the bottom is urged by an inner pressure of the sealed space S to go back to the hot water tank 120 through the drain hose 19. Then, it is again supplied to the boiler 22 by the hot water pump 23, and heated by the boiler 22. Subsequently, the foregoing operations are repeated.

When the hot water is cyclically sprayed out from the hot water hose 18 through the circuit formed of the hot water hose 18, the drain hose 19, the hot water tank 20, the water supply pipe 21, the hot water pump 23 and the boiler 22, the lining bag 1 is heated to cause the thermosetting hardenable resin to be uniformly hardened. After the thermosetting resin impregnated in the lining bag 1 has been hardened, the inner wall of the manhole 6 has been lined or repaired by the hardened liner bag 1, followed by the completion of a sequence of the lining works after unnecessary portions of the hardened liner bag 1 is cut.

After the completion of a sequence of works involved in the lining process, the water stopping plugs, not shown, and the water passing hose 9 are removed from the pipeline 8, allowing the filler 10 remaining in the pipeline 8 to flow downstream in the pipeline 8 together with sewage or the like.

In the manhole lining method according to the present invention as described above, since the plastic film 5 forming the inner surface of the liner bag 1 is coated (welded or adhered) over the resin absorbent material, it is not necessary to strip off the plastic film 5 functioning as a fluid pressure barrier liner from the inner surface of the hardened liner bag 1, as has been required before, thus making it possible to realize a reduction in the number of steps involved in the lining process, a working term, and a working cost. The plastic film 5 functioning as a fluid pressure barrier film remains as it is on the inner surface of the hardened liner bag 1, after the lining, so that the surface of the liner bag 1, as a hardened material, is covered with and protected by the plastic film 5 to increase the durability of the liner bag 1.

Also, in the liner bag 1 according to the present invention, the resin absorbent materials constituting the outer-layer liner bag 2 and the inner-layer liner bag 3 are made of a material which exhibits ductility with the action of the fluid pressure. The outer-layer liner bag 2 has an outer diameter smaller than the inner diameter of the existing manhole 6 so as to form a clearance therebetween, while the inner-layer liner bag 3 has an outer diameter smaller than the outer diameter of the outer-layer liner bag 2 so as to likewise form a clearance therebetween. This feature allows the outer-layer liner bag 2 and the inner-layer liner bag 3 to inflate and stretch upon receiving an air pressure, so that even if a slight offset is experienced during the installation of the liner bag 1 into the existing manhole 6, the inner surface of the liner bag 1 can be prevented from wrinkling, leading to high quality lining free from wrinkles on the inner surface of the hardened liner bag 1.

In the foregoing embodiment, sprayed hot water is used as a means for hardening the thermosetting resin impregnated in the liner bag. Alternatively, any other suitable means, such as poured hot water, circulated hot water, steam and so on, may be employed. Also, a photo-setting resin or the like may be used as the hardenable resin impregnated in the liner bag, other than the thermosetting resin.

As will be apparent from the foregoing description, since the manhole lining method performed using the manhole liner bag eliminates the necessity of stripping off the plastic film (corresponding to a fluid pressure barrier liner of a conventional manhole liner bag) from the hardened liner bag and wasting the same, as before, it is possible to realize a reduction in the number of steps involved in the lining process, a working term, and a working cost. Furthermore, the plastic film functioning as a fluid pressure barrier film during the lining process remains as it is on the inner surface of the hardened liner bag, after the lining, so that the surface of the liner bag, as a hardened material, is covered with and protected by the plastic film to increase the durability of the liner bag.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A liner bag for a manhole comprising:
   an outer-layer liner bag including a first bag-shaped resin absorbent material, and an unhardened liquid hardenable resin impregnated in said first bag-shaped resin absorbent material; and
   an inner-layer liner bag including a second bag-shaped resin absorbent material, a highly air-tight plastic film coated over an inner surface of said second bag-shaped resin absorbent material, and an unhardened liquid hardenable resin impregnated in said second bag-shaped resin absorbent material, said inner-layer liner bag having a thickness smaller than said outer-layer liner bag,
   said inner-layer liner bag being inserted in said outer-layer liner bag.

2. A liner bag for a manhole according to claim 1, wherein said outer-layer liner bag has an outer diameter smaller than an inner diameter of an existing manhole by 2% to 20% to form a clearance between said outer-layer liner bag and said existing manhole, and said inner-layer liner bag has an inner diameter smaller than the inner diameter of said outer-layer liner bag by 2% to 20% to form a clearance between said inner-layer and outer-layer liner bags.

3. A liner bag for manhole according to claim 1, wherein said outer-layer liner bag and said inner-layer liner bag respectively have a reducer portion, and the length of said outer-layer liner bag except for the reducer portion is set shorter than the depth of the existing manhole except for a reducer section of the existing manhole, and the length of said outer-layer liner bag except for the reducer portion is set shorter than the length of said outer-layer liner bag except for the reducer portion.

4. A liner bag for a manhole according to claim 1, wherein the thickness of the second resin absorbent material constituting said inner-layer liner bag is set to a range of 2 m/m to 12 m/m when it is applied with a load of 200 g/cm$^2$.

5. A liner bag for a manhole according to claim 1, wherein the second resin absorbent material of said inner-layer liner bag is made of unwoven fabric, and said plastic film coated over the inner surface of the resin absorbent material is formed of a polyurethane film having a Shore hardness equal to or larger than 85 and a thickness equal to or larger than 0.25 m/m.

6. A liner bag for a manhole according to claim 1, wherein said second resin absorbent material constituting said inner-layer liner bag is made of unwoven fabric having a weight ranging from 100 g/m$^2$ to 1500 g/m$^2$.

7. A liner bag for a manhole according to claim 1, wherein said highly air-tight plastic film coated over the inner surface of said second bag-shaped resin absorbent material is left as a fluid pressure barrier film after said manhole liner bag has been hardened.

8. A method of lining a manhole comprising the steps of:
   providing an outer-layer liner bag including a first bag-shaped resin absorbent material, and an unhardened liquid hardenable resin impregnated in said first bag-shaped resin absorbent material;
   providing an inner-layer liner bag including a second bag-shaped resin absorbent material, a highly air-tight plastic film coated over an inner surface of said second bag-shaped resin absorbent material, and an unhardened liquid hardenable resin impregnated in said second bag-shaped resin absorbent material, said inner-layer liner bag having a thickness smaller than said outer-layer liner bag;
   inserting said outer-layer liner bag into an existing manhole;
   everting and inserting said inner-layer liner bag into said outer-layer liner bag to form a manhole liner bag;
   acting a fluid pressure on a sealed space formed within said manhole liner bag to press said manhole liner bag onto an inner wall of the existing manhole; and
   hardening the liquid hardenable resin impregnated in said first resin absorbent material of said outer-layer liner bag and said second resin absorbent material of said inner-layer liner bag.

9. A method of lining a manhole according to claim 8, wherein said highly air-tight plastic film coated over the inner surface of said second bag-shaped resin absorbent material is left as a fluid pressure barrier film after said manhole liner bag has been hardened.

* * * * *